US011991604B2

(12) United States Patent
Stein et al.

(10) Patent No.: US 11,991,604 B2
(45) Date of Patent: May 21, 2024

(54) MULTI-SENSOR WITNESS INTEGRITY SENSING PLATFORM

(71) Applicant: Analog Devices, Inc., Norwood, MA (US)

(72) Inventors: Yosef Stein, Sharon, MA (US); Armindo Chaves, Hudson, MA (US); Hazarathaiah Malepati, Farmington, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 79 days.

(21) Appl. No.: 16/994,034

(22) Filed: Aug. 14, 2020

(65) Prior Publication Data

US 2021/0067923 A1 Mar. 4, 2021

Related U.S. Application Data (60) Provisional application No. 62/892,873, filed on Aug. 28, 2019.

(51) Int. Cl.
| | |
|---|---|
| *H04W 4/38* | (2018.01) |
| *G01M 5/00* | (2006.01) |
| *H04W 84/18* | (2009.01) |

(52) U.S. Cl.
CPC ........... *H04W 4/38* (2018.02); *G01M 5/0033* (2013.01); *G01M 5/0041* (2013.01); *H04W 84/18* (2013.01)

(58) Field of Classification Search
CPC ......... H04W 4/38; H04W 84/18; H04W 4/40; G01M 5/0033; G01M 5/0041; H04L 67/12
See application file for complete search history.

(56) References Cited

U.S. PATENT DOCUMENTS

| | | | |
|---|---|---|---|
| 6,529,127 B2 * | 3/2003 | Townsend | G01L 1/2256 340/10.5 |
| 9,485,605 B2 | 11/2016 | Beran et al. | |
| 10,403,059 B2 | 9/2019 | Moravek et al. | |

(Continued)

FOREIGN PATENT DOCUMENTS

| | | |
|---|---|---|
| EP | 2396971 B1 | 8/2010 |
| WO | 2014018288 A1 | 1/2014 |

OTHER PUBLICATIONS

C. Zhang, J. Kurose, Y. Liu, D. Towsley and M. Zink, "A Distributed Algorithm for Joint Sensing and Routing in Wireless Networks with Non-Steerable Directional Antennas," Proceedings of the 2006 IEEE International Conference on Network Protocols, Santa Barbara, CA, USA, 2006, pp. 218-227 (Year: 2006).*

(Continued)

*Primary Examiner* — Quan Zhen Wang
*Assistant Examiner* — Rajsheed O Black-Childress
(74) *Attorney, Agent, or Firm* — ArentFox Schiff LLP (57) ABSTRACT

Systems and methods are provided for wirelessly communicating with multiple sensors. In particular, a multi-sensor platform is provided that acts as an intermediary node and can communicate with multiple integrity sensors. The integrity sensors are each coupled via a wired connection to the multi-sensor platform, and the multi-sensor platform is powered wirelessly by a radiofrequency transmitter. The radiofrequency transmitter can receive data from multiple sensors via one node, the multi-sensor platform, thus allowing the radiofrequency transmitter to have a static transmission beam.

17 Claims, 7 Drawing Sheets

(56) References Cited

U.S. PATENT DOCUMENTS

| | | | |
|---|---|---|---|
| 10,486,803 B2 | 11/2019 | Black et al. | |
| 2005/0017873 A1* | 1/2005 | Liu | G01M 5/0041 |
| | | | 340/870.01 |
| 2011/0285527 A1* | 11/2011 | Arms | G07C 5/085 |
| | | | 340/539.1 |
| 2017/0025857 A1* | 1/2017 | Matthews | H02J 50/40 |
| 2019/0181685 A1* | 6/2019 | Su | H04B 5/0062 |
| 2019/0222652 A1* | 7/2019 | Graefe | H04W 84/18 |
| 2020/0110041 A1* | 4/2020 | Ziehl | G10L 25/51 |

OTHER PUBLICATIONS

Bibliographic Data of EP2396971, 1 page.

\* cited by examiner

MULTI-SENSOR WITNESS INTEGRITY SENSING PLATFORM

PRIORITY DATA

This application claims the benefit of and priority from U.S. Provisional Patent Application No. 62/892,873, filed Aug. 28, 2019, entitled, "Multi-Sensor Wireless Identification and Sensing Platform (MS-WISP)". This U.S Provisional Patent Application is incorporated by reference in its entirety.

FIELD OF THE DISCLOSURE

The present invention relates to a sensor system, including a wireless sensor system.

BACKGROUND

Helicopters, airplanes, rotorcraft, and other vehicle structure integrity sensing is used to detect cracks, corrosion, and other structural changes to the vehicle. Structural integrity sensing is often done in legacy devices by mounting a cluster of wireless sensors in hard-to-reach hotspot locations. In such a case, 1:1 radio frequency (RF) energy harvesting sensors may be powered from a near-by mounted RF energy exciter. In legacy devices, the RF energy exciter uses a steering mechanism, such as a mechanical or phased array steering mechanism, to turn toward and transmit a wireless signal to each one of the wireless sensors within a cluster. Each wireless sensor then converts the wireless signal to power. However, steering the RF energy exciter for powering each of multiple sensors can present difficulties.

As used herein, the term "WISP" may be interpreted as an acronym that stands for "witness integrity sensing platform." In other embodiments, the term "WISP" may be an acronym that stands for "wireless integrity sensing platform" or some other appropriate definition.

SUMMARY

Systems and methods are provided for wirelessly providing power to multiple sensors. In particular, a multi-sensor platform is provided that acts as an intermediary node and can communicate with multiple integrity sensors. The integrity sensors are each coupled via a wire to the multi-sensor platform, and the multi-sensor platform is powered wirelessly by a radiofrequency transmitter. In some examples, for instance in aerospace applications, integrity sensing uses a cluster of sensors. Systems and methods are provided for enabling the radiofrequency transmitter to communicate with multiple sensors via one node, the multi-sensor platform, thus allowing the radiofrequency transmitter to have a static transmission beam. In some implementations, the radiofrequency transmitter is configured to receive communications from multiple sensors via the multi-sensor platform, similarly allowing the radiofrequency transmitter to have a static reception beam.

According to one aspect, a system for witness integrity sensing includes a plurality of sensors and a sensor platform including an antenna configured to receive a wireless signal, a hotspot transceiver configured to transmit a point-to-point radiofrequency energy signal, and a sensor platform including an antenna configured to receive the radiofrequency energy signal, an energy harvesting module coupled to the antenna configured to convert the radiofrequency energy signal to charge to power the sensor platform, and a sensor multiplexer, coupled to each of the plurality of sensors via a respective plurality of wires, wherein the sensor multiplexor is configured to collect the plurality of sensors sensed data via the respective plurality of wires. According to some implementations, the sensor multiplexer is configured to receive data from each of the plurality of sensors via the respective plurality of wires. In some implementations, the hotspot transceiver has a static radiofrequency transmission beam.

In some implementations, the system further includes a processor configured to receive sensed data from the plurality of sensors and perform cluster-based edge-integrity analytics. In some implementations, the system further includes a processor configured to receive sensed data from the plurality of sensors and transmit the sensed data.

In some implementations, hotspot transceiver has a static transmitter that emits a static transmission beam.

In some implementations, the multiplexer is configured to receive sensed data from each of the plurality of sensors sequentially. In some implementations, each of the plurality of sensors is a structural integrity sensor. In some implementations, each of the plurality of sensors is configured to detect at least one of cracking, corrosion, strain, strain gauge, and torque.

According to another aspect, a method for witness integrity sensing includes emitting static radiofrequency transmission beam including a radiofrequency signal from a hotspot transceiver, receiving a radiofrequency signal at an antenna, converting the radiofrequency signal to charge at an energy harvesting module, providing the charge to a sensor platform including a multiplexer, wherein the multiplexor is connected to a plurality of sensors via a plurality of wires, and collecting sensed data from each of the plurality of sensors at the multiplexer. Collecting sensed data includes collecting sensed data consecutively, at the multiplexer, from the plurality of sensors.

In some implementations, collecting sensed data consecutively, at the multiplexer, includes collecting sensed data consecutively to each sensor of the plurality of sensors. In some implementations, collecting sensed data consecutively, at the multiplexer, includes collecting sensed data consecutively to a first portion of the plurality of sensors and a second portion of the plurality of sensors.

In some implementations, the method further includes receiving sensed data at a processor. In some implementations, the method includes performing cluster-based edge-integrity analytics on the sensed data to generate a data signal. In some implementations, the method includes wirelessly transmitting the data signal to a hotspot transceiver. In some implementations, the method further includes storing the charge from the energy harvesting module in an energy storage module, and providing the stored charge to the sensor platform.

According to another aspect, a multi-sensor witness integrity sensor platform includes a plurality of sensors, a hotspot transceiver configured to transmit a point-to-point radiofrequency energy signal, and a passive computing device communicatively coupled with the plurality of sensors by wired connections, wherein the passive computing device is configured to receive the radiofrequency signal, convert the radiofrequency signal to charge, power a sensor platform using the charge, and receive sensed data from respective ones of the plurality of sensors through the wired connections.

In some implementations, the passive computing device includes a multiplexer configured to collect the sensed data sequentially from each of the plurality of sensors.

In some implementations, the computing device is further configured to provide a wireless data signal based on the sensed data. In some implementations, the computing device is further configured to perform cluster-based edge-integrity analytics on the sensed data. In some implementations, the multi-sensor witness integrity sensor platform optimizes the overall system time for cold start and sensor status data.

According to some implementations, a passive three-dimensional (3D) multi-sensor WISP (MS-WISP) includes a sensor multiplexer layer, a sensing platform digital layer, an energy harvesting and power-management layer, and a RF energy harvesting antenna layer, wherein the MS-WISP eliminates the need for an energy transfer beam steering mechanism to power a sensor cluster mounted at a hotspot.

According to some implementations, a passive Multi-Sensor Witness Integrity Sensing system includes a passive 3D MS-WISP connected to a cluster of Witness Integrity sensing elements and powered by a mounted energy exciter with a fixed antenna.

According to some implementations, a MS-WISP includes a plurality of sensors and a computing device electrically and communicatively coupled with the plurality of sensors by a wired connection. The computing device is configured to generate power based on a wireless signal received from a transceiver, provide the power to respective sensors of the plurality of sensors, receive sensed data from respective ones of the sensors, and provide a wireless data signal to the transceiver based on the sensed data.

According to some implementations, a sensor system is provided for use in a vehicle, wherein the sensor system includes a transceiver, and a MS-WISP communicatively coupled with the transceiver by a wireless connection. The MS-WISP includes a computing device electrically and communicatively coupled with a plurality of sensors by a wired connection, wherein the computing device is to generate power from a wireless signal received from the transceiver and provide the power to respective sensors of the plurality of sensors based on a wireless signal received from the transceiver.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense.

Generally, embodiments herein relate to a multi-sensor witness integrity sensing platform (MS-WISP) approach which eliminates the need for a steering mechanism for a wireless transmitter. In particular, some MS-WISP systems use electronic and/or mechanical steering system to direct the wireless transmission to various sensors. Instead, systems and methods are provided such that the wireless transmission is completed point-to-point between the wireless transmitter and an MS-WISP antenna. The point-to-point transmission occurs with a static transmission beam, and there is no movement or steering of the transmission beam. According to various implementations, the wireless transmitter transmits energy to a MS-WISP platform module which communicates with multiple sensors. In one example, the energy is radiofrequency energy. In some examples, the sensors transmit communications, such as sensed data, back to the MS-WISP platform module.

The MS-WISP includes an antenna for receiving wireless signals. In some implementations, the MS-WISP antenna is a MS-WISP energy harvesting antenna. The MS-WISP energy harvesting antenna receives the wireless transmissions from a wireless transmitter and converts the received transmissions into energy. The energy can be used, for example, to power the sensor platform, including one or more of a processor, a multiplexer, and a transceiver, as well as any other sensor platform elements. In some examples, the wireless transmissions include radiofrequency energy. In various examples, the MS-WISP platform receives sensed data from multiple sensing elements (i.e., sensors). In some examples, the multiple sensing elements are grouped in a sensor cluster. In some examples, the MS-WISP form factor is a 3D stacked module approach.

Figure 1:
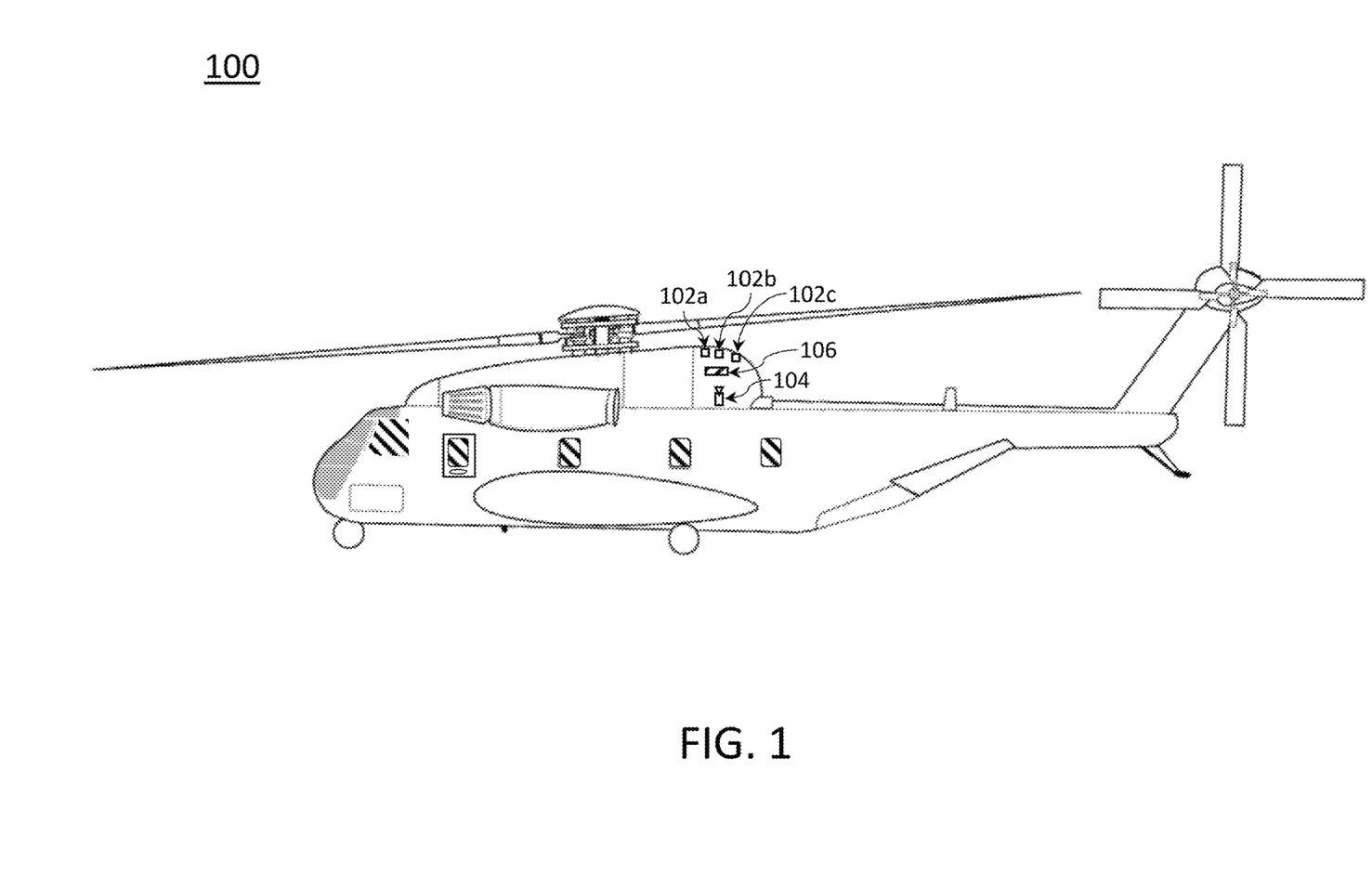
FIG. 1 depicts an example of a hotspot cluster in a helicopter, in accordance with embodiments of the disclosure.

FIG. 1 depicts an example of a sensor cluster in a helicopter 100, in accordance with various embodiments. Specifically, the helicopter 100 includes a sensor cluster 102a-102c and an MS-WISP platform module 106 within proximity of a wireless transmitter 104. In some examples, the wireless transmitter 104 is a RF-mounted exciter. The wireless transmitter 104 transmits a signal the MS-WISP platform 106. The MS-WISP platform 106 receives the radiofrequency signal, and processes the signal to generate charge to power the MS-WISP platform 106. Data from the sensors 102a-102c is received at the MS-WISP platform 106. In various examples, the sensors 102a-102c are configured to generate sensed data related to corrosion, crack, strain, or some other parameter of the helicopter 100. In general, the sensors 102a-102c are configured to generate sensed data related to a structural parameter of the structure or vehicle to which they are coupled.

It will be understood that although a helicopter is depicted in FIG. 1, in other embodiments the MS-WISP can be used in a different vehicle (e.g., a different type of helicopter or rotorcraft, an airplane, a ship, or a land vehicle such as a car). In some implementations, the MS-WISP is used in a non-vehicular environment such as a building or some other structure.

Figure 2:
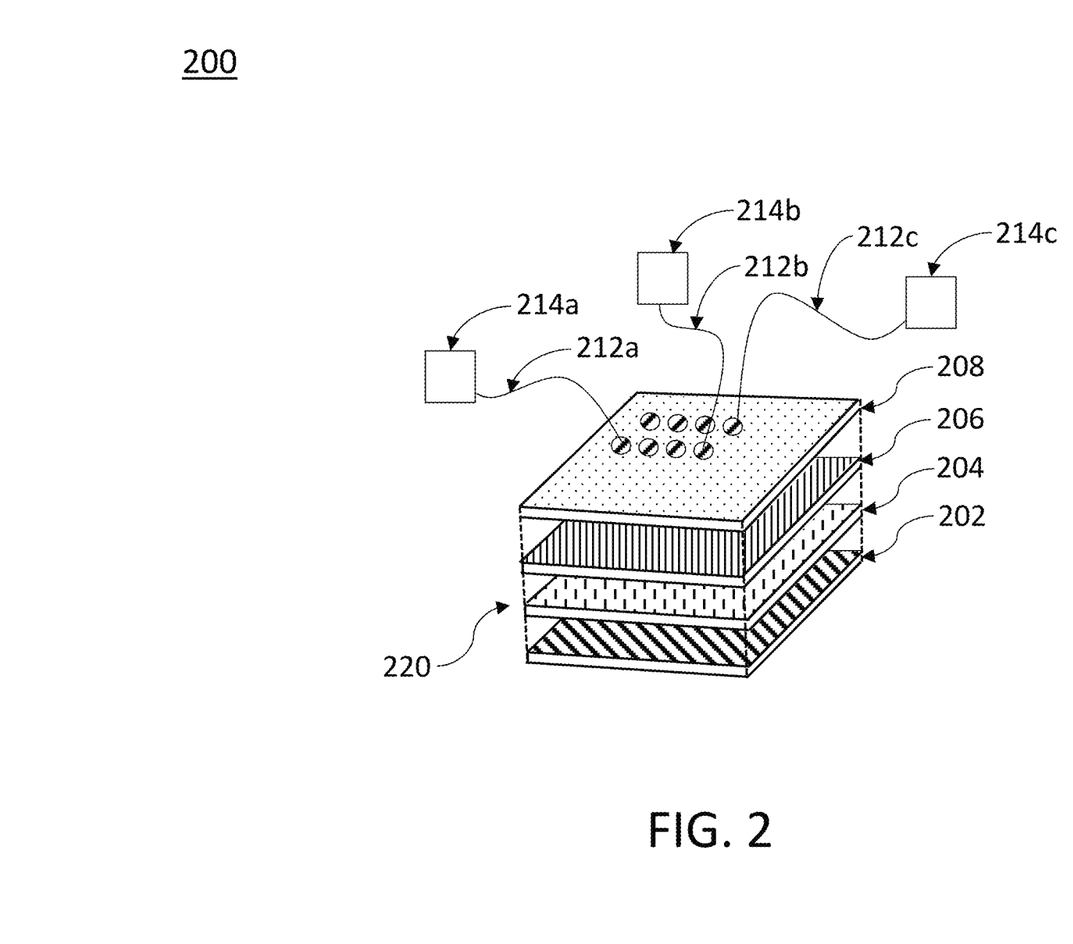
FIG. 2 illustrates an example of a multi-sensor witness integrity sensing platform (MS-WISP), in accordance with various embodiments of the disclosure.

FIG. 2 depicts an example 200 of a multi-sensor witness integrity sensing platform (MS-WISP) module 220 and multiple sensors, according to various embodiments of the disclosure. The platform module 220 has four layers: an energy harvesting antenna layer 202, an energy storage layer 204, a processing layer 206, and a multiplexor layer 208. The energy harvesting antenna layer 202 includes an antenna and receives energy transmitted from a wireless transmitter. In some examples, the energy harvesting antenna layer 202 receives electromagnetic energy. The energy storage layer 204 converts the harvested energy to a usable charge and stores the charge. The processing layer 206 receives and processes signals from one or more sensors 214a-214c via the multiplexor layer 208. In some examples, the processing layer is a printed circuit board. The multiplexor layer 208 includes a plurality of sensor input elements 210, and receives sensor data via the sensor input elements 210 from the sensors 214a-214c. The layers 202, 204, 206, 208 are described in greater detail with respect to FIG. 3.

As shown in FIG. 2, the first 214a, second 214b, and third 214c sensors are coupled to the sensor input elements 210 of the multiplexor layer 208. In particular, each of the first 214a, second 214b, and third 214c sensors is coupled to a sensor input element 210 of the multiplexor layer 208 via first 212a, second 212b, and third 212c wires, respectively.

In various implementations, the sensors 214a-214c are configured to generate sensed data related to corrosion, cracks, torque, strain, strain gauge, or some other parameter of a device on which the sensors 214a-214c are located. In one example, the sensors 214a-214c are positioned in the hull of a helicopter. In another example, the sensors 214a-214c are positioned on the wing of an aircraft. In various examples, the sensors 214a-214c are positioned in a vehicle and designed to sense a parameter related to the structure and/or the structural integrity of the vehicle. In some examples, the sensors 214a-214c are called sensing elements. The sensors 214a-214c can also be used for flight simulations.

The first 214a, second 214b, and third 214c sensors can be placed at various locations in proximity to the platform module 220. The distance between the sensors 214a-214c and the multiplexor layer 208 depends on the length of the wires 212a-212c. In some implementations, the sensors 214a-214c are passive sensors, such that the one or more sensors 214a-214c do not need to be powered. In other implementations, the platform module 220 provides power to the sensors 214a-214c through the multiplexor layer 208 via the wires 212a-212c. In some examples, the multiplexor layer 208 of the platform module 220 receives data signals from the sensors 214a-214c.

In various implementations, the sensors 214a-214c communicate sensed data with the platform module 220 via the wires 212a-212c. In some examples, the multiplexer layer 208 receives one or more data signals from the sensors 214a-214c and provides the received data signals to, for example, the processing layer 206 of the stacked module 220 for further processing. In some examples, the sensors 214a-214c transmit data directly to the processing layer 206. In some implementations, a mix of witness integrity sensing elements are used by the platform module 220 to perform hotspot integrity analytics.

In various implementations, the multiplexor layer 208 receives sensed data from one sensor 214a-214c at a time. In one example, the multiplexor receives sensed data from each sensor 214a-214c on a round-robin schedule. In one example, the multiplexor connects with each sensor 214a-214c individually, sequentially, and repeatedly. In some examples, the multiplexor receives communications from each of the sensors 214a-214c on a round-robin schedule.

In various implementations, the MS-WISP system includes more than three sensors 214a-214c connected to the multiplexor 208. In some examples, the MS-WISP system includes one, two, four, five, six, seven, eight, ten, or more than ten sensors.

Figure 3:
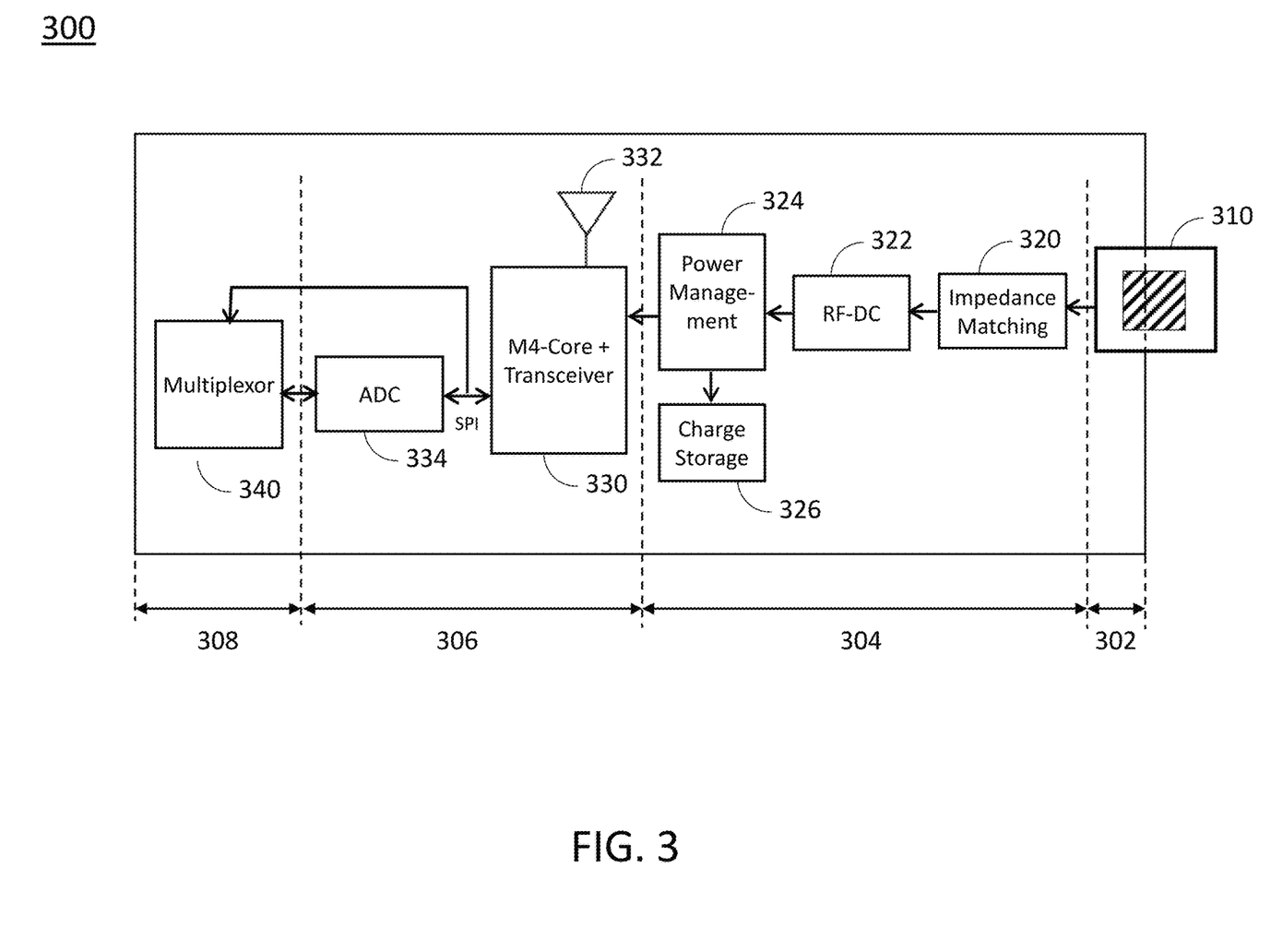
FIG. 3 is diagram illustrating a platform module of a multi-sensor witness integrity platform, in accordance with various embodiments of the disclosure.

FIG. 3 depicts a diagram of a platform module 300 of the multi-sensor witness integrity platform, such as the platform module 220 of FIG. 2, in greater detail. Specifically, FIG. 3 depicts the four layers of the module 300. The first layer is the energy harvesting antenna layer 302, and includes an energy harvesting antenna 310. The energy harvesting antenna 310 is configured to receive one or more wireless signals from a hotspot mounted transceiver, as described in greater detail with respect to FIG. 4. The wireless signals, as described below, may be in accordance with an ISM RF band and/or a RFID protocol. The energy harvesting antenna 310 is configured to receive wireless signals that can be converted to energy to power the platform module and the sensors of the MS-WISP.

The second layer of the platform module 300 of the MS-WISP is an energy storage layer 304. The energy storage layer 304 harvests energy received at the energy harvesting antenna 310 in the first layer, and manages the extracted power. The energy storage layer 304 includes one or more circuit elements. The circuit elements can be active or passive. As shown in FIG. 3, the energy storage layer 304 includes an impedance-matching circuit 320, a radiofrequency-direct current (RF-DC) circuit 322, a power management circuit 324, and a charge storage circuit 326.

The circuits 320, 322, 324, and 326 of the energy storage layer 304 are configured to generate or regulate power from the wireless signals received by the energy harvesting antenna 310. In particular, radiofrequency signals received at the energy harvesting antenna 310 are input to the impedance matching circuit 320. In some examples, the impedance matching circuit 320 maximizes energy transfer from the antenna 310 to the RF-DC circuit 322. The RF-DC circuit 322 converts radiofrequency energy to DC voltages, and outputs the converted signal to the power management circuit 324.

The power management circuit 324 receives a DC signal from the RF-DC circuit 322 as input. In some examples, the power management circuit 324 is connected to a charge storage circuit 326. In some examples, the charge storage circuit 326 includes multiple capacitors. In some examples, the charge storage circuit 326 includes one or more batteries. The charge from the DC signal input to the power management circuit 324 can be stored in the charge storage circuit 326. The power management circuit 324 outputs power to the third layer 306, the processing layer 306. The power management circuit 324 can retrieve energy from the charge storage circuit 326 to provide power to the processing layer. In some examples, when the power management circuit 324 receives more input power from the RF-DC circuit 322 than the power management circuit 324 outputs to the processing layer 306, the power management circuit 324 stores the extra power in the charge storage circuit 326. In some examples, when the power management circuit 324 outputs more power to the processing layer 306 than it receives from the RF-DC circuit 322, the power management circuit 324 retrieves charge from the charge storage unit 326 to provide power to the processing layer 306.

The third layer of the stacked module of the MS-WISP is a processing layer 306. The processing layer 306 includes a printed circuit board, and the printed circuit board can be a digital printed circuit board. The printed circuit board can include active and passive circuit elements. The processing layer 306 includes an analog-to-digital converter (ADC) 334, a processor 330, a wireless transceiver, and an antenna 332. In some examples, the transceiver is a Bluetooth low energy (BLE) transceiver. In various examples, the processor 330 is a single or multi-core processor, an M4-core processor, or some other type of processor.

According to various implementations, the processor 330 is configured to perform cluster-based edge-integrity analytics. Specifically, the processor 330 is configured to receive sensed data from the various sensors to which the MS-WISP platform module 300 is coupled, and process the data. The sensed data is received from the multiplexer 340 at the ADC 334 of the processing layer 306. The ADC 334 converts the received analog sensed data to digital sensed data, and the converted sensed data is input to the processor 330. In some examples, the processor 330 performs cluster-based edge integrity analytics on the converted data, and transmits the results of the analytics via a transceiver. In some examples, the processor 330 receives the converted sensed data and transmits the converted data. In particular, a transceiver in the processor 330 is coupled to an antenna 332 which can send one or more wireless signals to a hotspot mounted reader/transceiver, as described in greater detail with respect to FIG. 4. For example, the antenna 332 can send one or more Bluetooth signals or wireless signals in accordance with a protocol and thereby provide a wireless data signal to a hotspot mounted reader.

The fourth layer of the MS-WISP platform module 300 is the multiplexor layer 308, and includes multiplexor 340. The multiplexor 340 is a 1:N sensor multiplexer. As described above with respect to FIG. 2, the multiplexer 340 of the fourth layer of the MS-WISP platform module 300 is communicatively coupled with various sensors (e.g., first 214a, second 214b, and third 234c sensors) by a wired connection. In various implementations, as described above, the multiplexer layer 308 manages data signals and/or power signals to and/or from the various sensors. The multiplexor layer 308 interfaces with a mix of WISP sensing elements.

Figure 4:
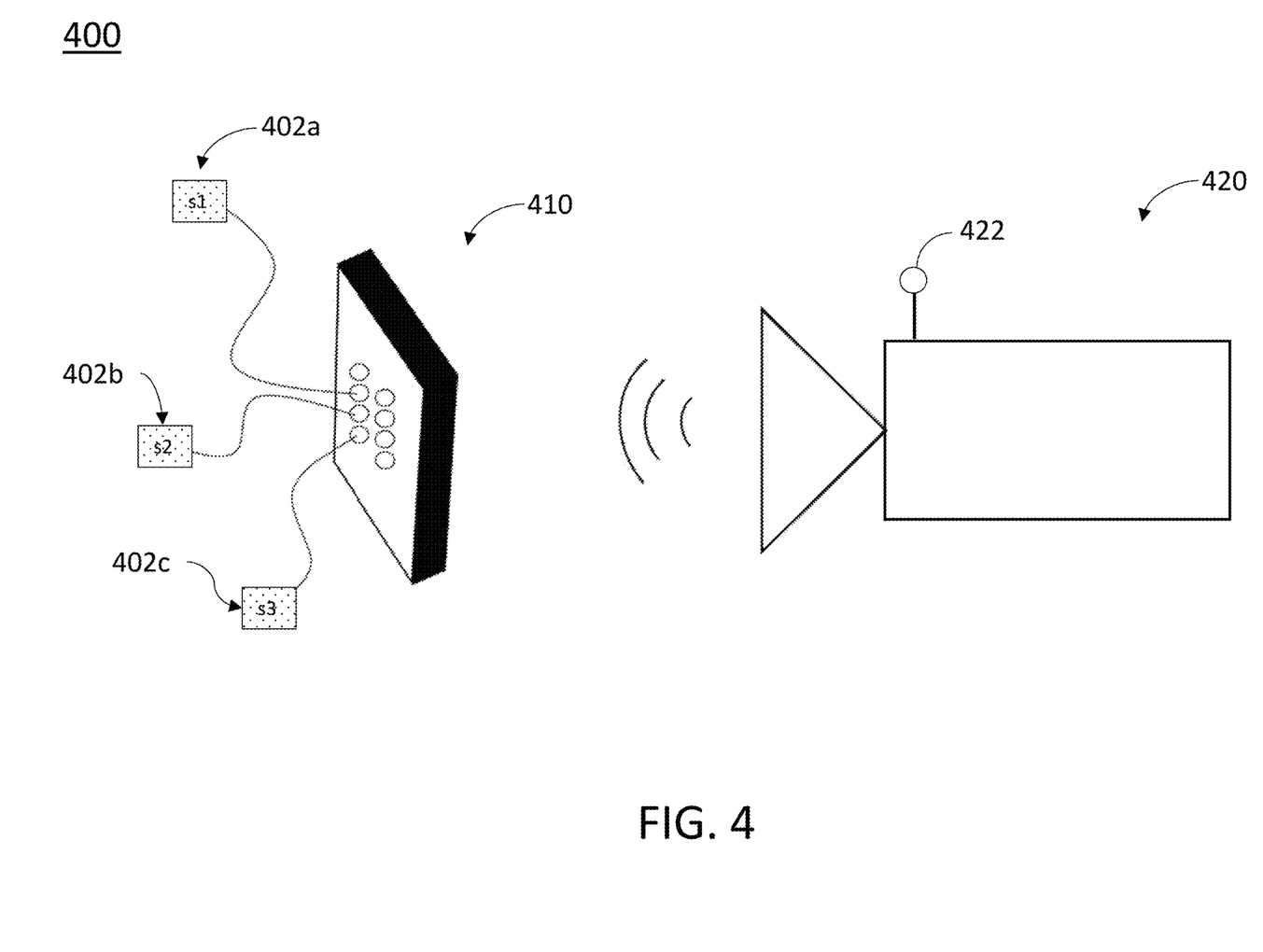
FIG. 4 is a diagram illustrating a system that includes an MS-WISP and a hotspot transmitter, in accordance with various embodiments of the disclosure.

FIG. 4 depicts a diagram of a Multi Sensor Witness Integrity Sensing system 400 that includes an MS-WISP 410, multiple sensors 402a-402c and a hotspot transmitter 420, in accordance with various embodiments. The hotspot transmitter 420 transmits wireless signals to the MS-WISP 410. In some implementations, the hotspot transmitter 420 transmits radiofrequency energy signals to the MS-WISP 410. In various examples, the hotspot transmitter 420 has a static energy transmitter, the hotspot transmitter 420 emits a point-to-point radiofrequency signal to the MS-WISP 410. In some examples, the hotspot transmitter 420 acts as a transceiver and is configured to receive wireless signals from the MS-WISP 410. The hotspot transmitter 420 includes an antenna 422 which can be, for example, a gain antenna. In some implementations, the hotspot transmitter 420 wirelessly transmits radiofrequency signals in accordance with a RF identification (RFID) protocol. In some examples, the wireless signals are RF signals in accordance with a worldwide (WW) industrial, scientific, and medical (ISM) RF band. In various examples, the ISM RF band is in the range of 5.725-5.875 gigahertz (GHz), 2.4-2.5 GHz, or some other worldwide RF band range.

According to various implementations, a passive Multi Sensor Witness Integrity Sensing system 400, as shown in FIG. 4, optimizes the overall system time for cold start and sensor status data. Cold start is the amount of time it takes to charge an energy storage module on the MS-WISP 410 from zero voltage to a minimum system operational voltage. In some examples, the minimum operational voltage is about 2.4 Volts. In general, the energy is represented by the following formula:

$$E = \tfrac{1}{2}CV^2 = P*t$$

wherein E is the energy, C is the capacitance, V is the voltage, P is the harvested power and t is time. In the Multi Sensor Witness Integrity Sensing system 400, the energy storage module of the MS-WISP 410 is charged once for all sensors 402a-402c. Thus, regardless of the number of sensors in the system, the MS-WISP 410 is charged one time. Once the MS-WISP 410 has sufficient charge, the MS-WISP 410 can begin receiving sensed data from the sensors 402a-402c. However, in a legacy witness integrity sensing system, in which there is only one sensor for each platform, and only one sensor for each energy storage module (a 1:1 system), the cold start charging process occurs once for each sensor. Thus, for N sensors, the cold start charging process occurs N times. In contrast, using the systems and methods described herein, for N sensors, the cold start charging process occurs one time.

Figure 5:
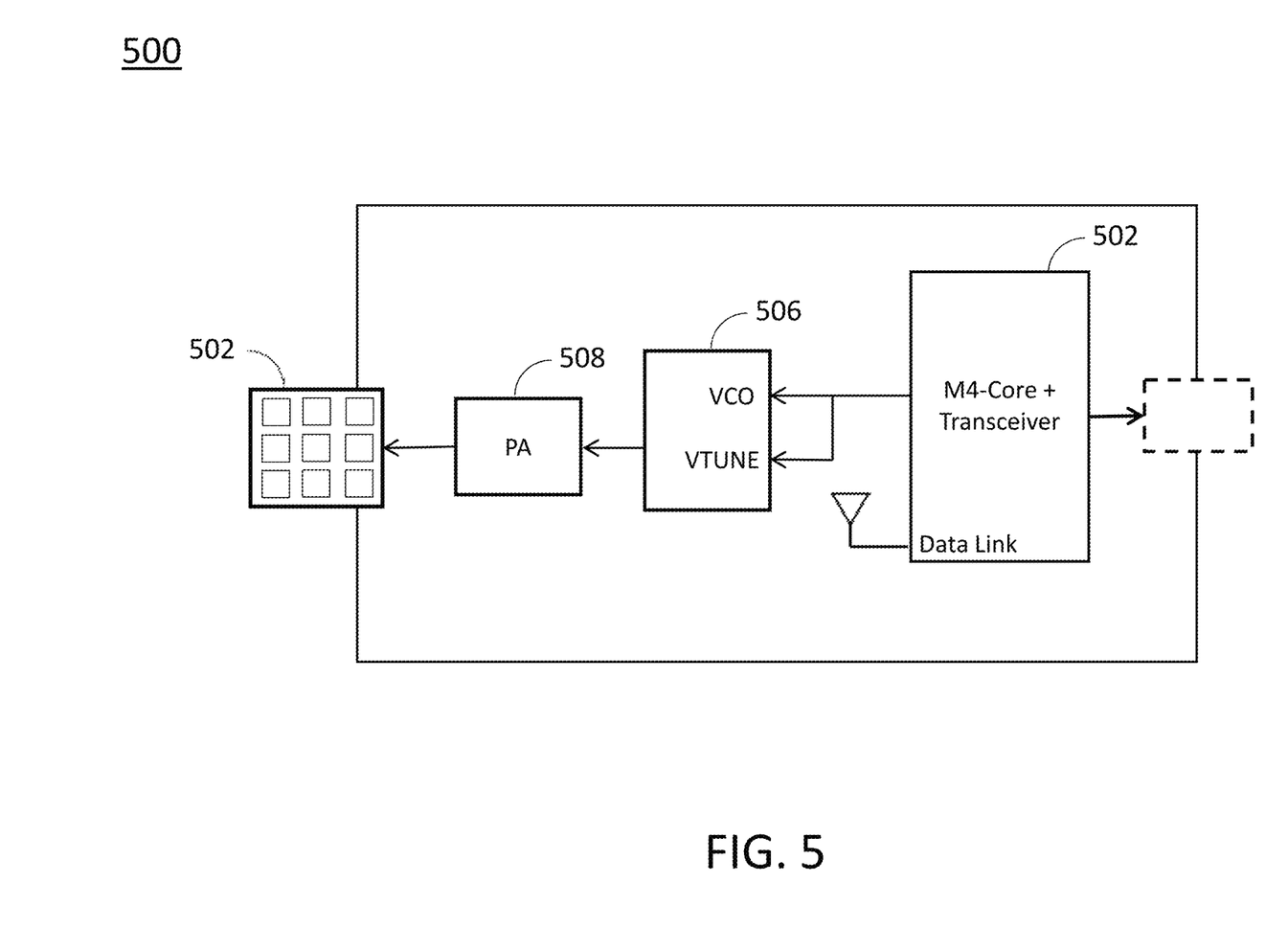
FIG. 5 is a diagram illustrating a hotspot transmitter, in accordance with various embodiments of the disclosure.

FIG. 5 depicts a diagram of a hotspot transceiver 500 for wirelessly transmitting signals to a MS-WISP. The hotspot transceiver 500 includes a processor and transceiver module 502, a voltage controlled oscillator (VCO) 506, a power amplifier 508, and a gain antenna 510. The processor and transceiver module 502 includes a data link 504. According to some examples, the processor and transceiver module and voltage controlled oscillator 506 produce a radiofrequency signal for transmission by the gain antenna 510. The power amplifier 508 increases the power level of the radiofrequency signal before the signal is sent to the gain antenna 510.

According to various implementations, the gain antenna 510 is a fixed antenna that is configured to communicate with the energy harvesting antenna of a MS-WISP, such as the energy harvesting antenna 410 of FIG. 4. In particular, the gain antenna 510 is fixed on the energy harvesting antenna of a MS-WISP, and the gain antenna 510 does not perform a mechanical or electronic sweep to communicate with multiple WISP elements. Rather, the gain antenna communicates with multiple WISP sensors through a 1:1 communication with an MS-WISP, such as the MS-WISP 200 shown in FIG. 2. In particular, the gain antenna 510 transmits a radiofrequency signal, and the RF signal may be in accordance with a WW ISM RF band, a RFID protocol, or some other type of communication.

In some implementations, the gain antenna 510 is a moveable antenna and is communicatively coupled with multiple elements. In one example, the gain antenna 510 is coupled to multiple MS-WISP devices. In another example, the gain antenna 510 is coupled to a MS-WISP device and at least one other device. When the gain antenna 510 is coupled with multiple elements, the gain antenna 510 performs a mechanical or electronic sweep among the multiple elements. Note that even when the gain antenna 510 sweeps among multiple elements, the amount of sweeping the gain antenna 510 performs can be significantly reduced compared to previous sensor systems because the connection with the MS-WISP(s) allows multiple sensors to provide data to a single MS-WISP, thus enabling reception of data from multiple sensors with a single gain antenna-MS-WISP connection.

In some implementations, the processor and transceiver module 502 is coupled (for example, via the data link 504) with the processing layer of an MS-WISP, for example the MS-WISP 200 of FIG. 2. In some examples, the processor and transceiver module 502 is coupled to the processing layer of an MS-WISP via a Bluetooth protocol. In particular, in some examples, the processor and transceiver module 502 receives data signals from a MS-WISP for further processing. In some implementations, the processor and transceiver module 502 is additionally configured to provide one or more data signals (e.g., computing instructions, elements of a handshake protocol, etc.) to the processing layer of a MS-WISP.

Figure 6:
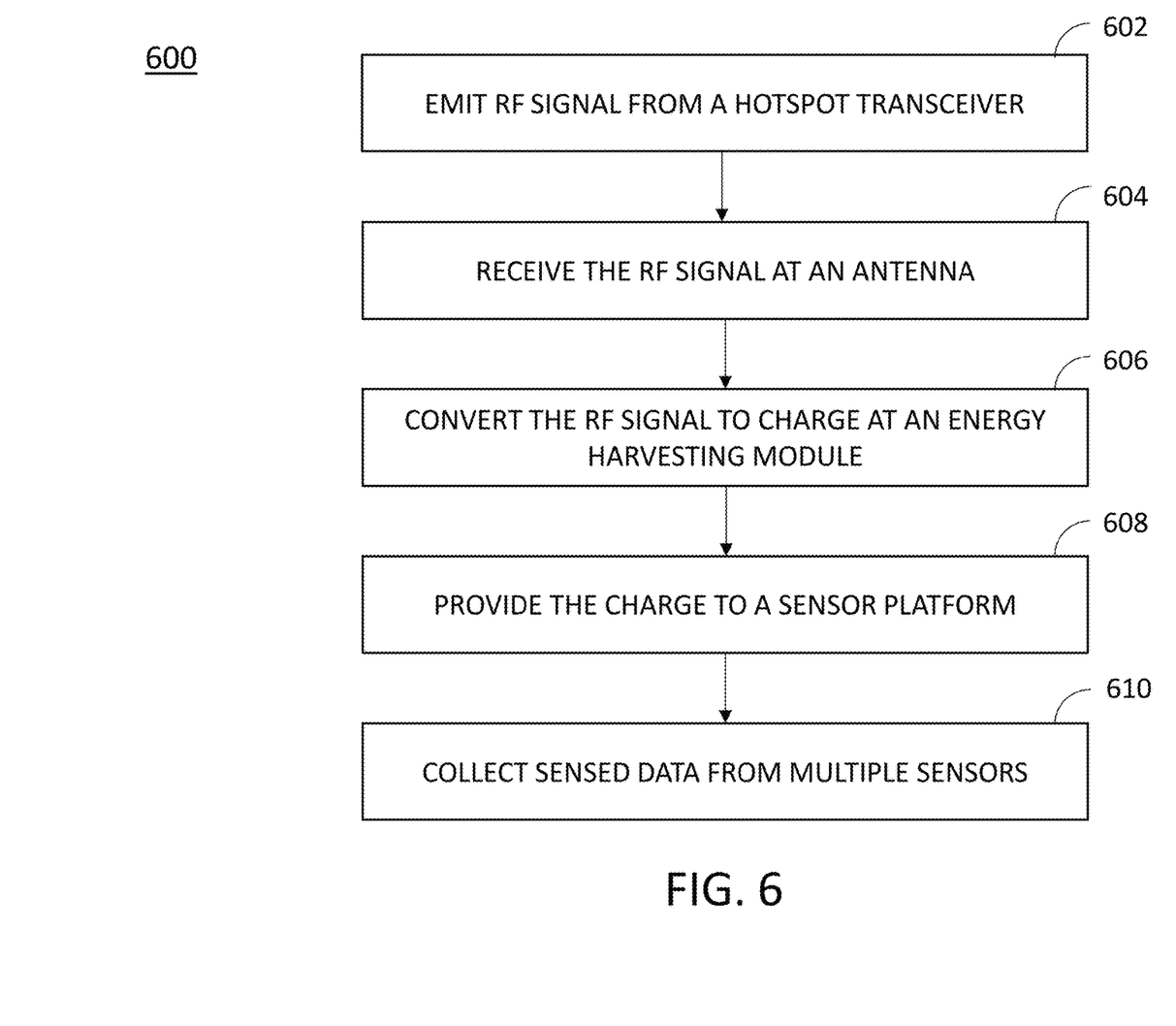
FIG. 6 is a flow chart illustrating a method for multi-sensor witness integrity sensing, in accordance with various embodiments of the disclosure.

FIG. 6 is a flow chart illustrating a method 600 for multi-sensor witness integrity sensing, in accordance with various embodiments of the disclosure. At step 602, a static radiofrequency transmission beam including a radiofrequency signal is emitted from a hotspot transceiver. In some examples, the radiofrequency signal transmitted by the hotspot transceiver is an RF energy signal. At step 604, the radiofrequency signal is received at an antenna. At step 606, the radiofrequency signal received at step 604 is converted to a charge at an energy harvesting module. The charge can be used for power, and it can be stored for later use, for example in one or more capacitors and/or batteries. At step 608, the charge is provided to a sensor platform including a multiplexor. The multiplexer is connected to multiple sensors. At step 610, sensed data is collected from the multiple sensors. In particular, the multiplexor collects the sensed data consecutively from each of the sensors. In some examples, the multiplexor collects sensed data from more than one sensor at a time. In one example, the multiplexer collects sensed data from two sensors at a time, and consecutively collects sensed data from a first group of two sensors and then to a second group of two sensors.

According to various implementations, the system described herein provides a number of advantages. Specifically, as described above, in legacy systems the hotspot mounted transceiver may have been performed an electronic or mechanical sweep to provide power to respective sensors of a WISP system. An electronic and/or mechanical sweep can be costly in terms of power, time, design, etc. As described herein, the hotspot transceiver can be communicatively coupled with a single MS-WISP and provide power to the MS-WISP, and the MS-WISP can then collect data from multiple various sensors of the MS-WISP system. In one example, in a system having eight sensors, a legacy system hotspot transceiver had to sweep through all eight sensors to provide power to a WISP platform for each sensor. However, using the MS-WISP implementations described herein, the hotspot transceiver can couple with a single MS-WISP to communicate with the eight sensors. This reduction in connections may lead to significant cost, time, energy, and design savings.

Figure 7:
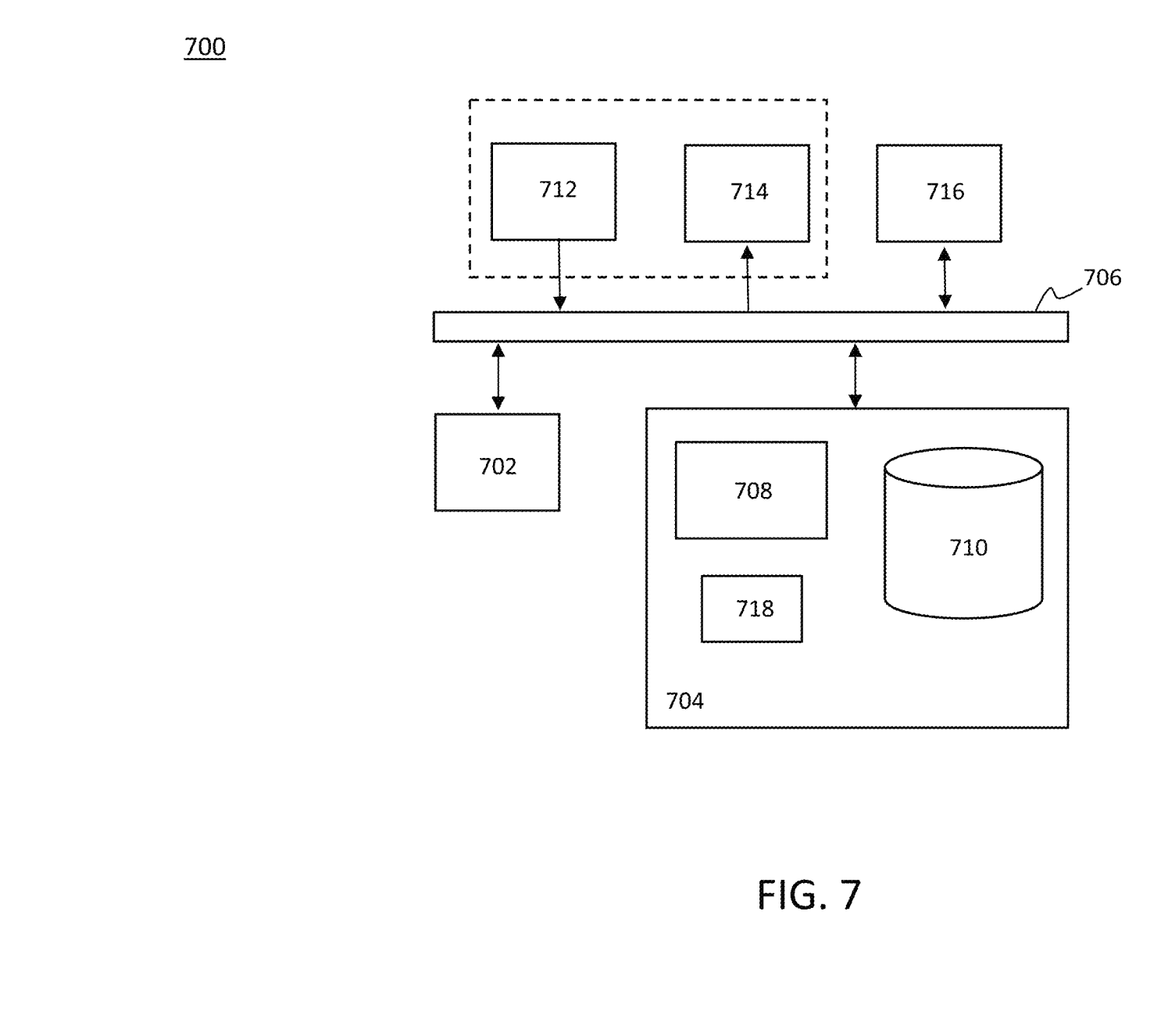
FIG. 7 depicts a block diagram illustrating an exemplary computing system that may be used for multi-sensor witness integrity sensing, according to some embodiments of the disclosure.

FIG. 7 depicts a block diagram illustrating an exemplary computing system that can be used for multi-sensor witness integrity sensing, according to some embodiments of the disclosure. As shown in FIG. 7, the data processing system 700 may include at least one processor 702 coupled to memory elements 704 through a system bus 706. As such, the data processing system may store program code within memory elements 704. Further, the processor 702 may execute the program code accessed from the memory elements 704 via a system bus 706. In one aspect, the data processing system may be implemented as a computer that is suitable for storing and/or executing program code. It should be appreciated, however, that the data processing system 700 may be implemented in the form of any system including a processor and a memory that is capable of performing the functions described within this specification.

The memory elements 704 may include one or more physical memory devices such as, for example, local memory 708 and one or more bulk storage devices 710. The local memory may refer to random access memory or other non-persistent memory device(s) generally used during actual execution of the program code. A bulk storage device may be implemented as a hard drive or other persistent data storage device. The processing system 700 may also include one or more cache memories (not shown) that provide temporary storage of at least some program code in order to reduce the number of times program code must be retrieved from the bulk storage device 710 during execution.

Input/output (I/O) devices depicted as an input device 712 and an output device 714 optionally can be coupled to the data processing system. In some examples herein, an input/output device is coupled to a hotspot transceiver. In some examples, input/output devices can be wireless coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 7 with a dashed line surrounding the input device 712 and the output device 714). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 716 may also be coupled to the data processing system to enable it to become coupled to other processing systems, computer systems, remote network devices, and/or remote storage devices through intervening private or public networks. The network adapter 716 may comprise a data receiver for receiving data that is transmitted by said systems, devices and/or networks to the data processing system 700, and a data transmitter for transmitting data from the data processing system 700 to said systems, devices and/or networks. Modems, cable modems, and Ethernet cards are examples of different types of network adapter that may be used with the data processing system 700.

As pictured in FIG. 7, the memory elements 704 may store an application 718. In various embodiments, the application 718 may be stored in the local memory 708, the one or more bulk storage devices 710, or apart from the local memory and the bulk storage devices. In some examples, the application 718 can include an application for cluster-based integrity analytics. It should be appreciated that the data processing system 700 may further execute an operating system (not shown in FIG. 7) that can facilitate execution of the application 718. The application 718, being implemented in the form of executable program code, can be executed by the data processing system 700, e.g., by the processor 702.

Responsive to executing the application, the data processing system 700 may be configured to perform one or more operations or method steps described herein.

In another aspect, the data processing system 700 may represent a client data processing system. In that case, the application 718 may represent a client application that, when executed, configures the data processing system 700 to perform the various functions described herein with reference to a "client". Examples of a client can include, but are not limited to, a personal computer, a portable computer, a mobile phone, or the like.

Persons skilled in the art will recognize that while the elements 702-718 are shown in FIG. 7 as separate elements, in other embodiments their functionality could be implemented in lesser number of individual elements or distributed over a larger number of components.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 702 described herein.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present disclosure.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

Note that the activities discussed above with reference to the FIGURES which are applicable to any integrated circuit that involves signal processing (for example, gesture signal processing, video signal processing, audio signal processing, analog-to-digital conversion, digital-to-analog conversion), particularly those that can execute specialized software programs or algorithms, some of which may be associated with processing digitized real-time data.

In some cases, the teachings of the present disclosure may be encoded into one or more tangible, non-transitory computer-readable mediums having stored thereon executable instructions that, when executed, instruct a programmable device (such as a processor or DSP) to perform the methods or functions disclosed herein. In cases where the teachings herein are embodied at least partly in a hardware device (such as an ASIC, IP block, or SoC), a non-transitory medium could include a hardware device hardware-programmed with logic to perform the methods or functions disclosed herein. The teachings could also be practiced in the form of Register Transfer Level (RTL) or other hardware description language such as VHDL or Verilog, which can be used to program a fabrication process to produce the hardware elements disclosed.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, processors may store information in any suitable type of non-transitory storage medium (for example, random access memory (RAM), read only memory (ROM), FPGA, EPROM, electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe.

Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a personal digital assistant (PDA), a smart phone, a mobile phone, an iPad, or any other suitable portable or fixed electronic device.

Also, a computer may have one or more input and output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Computer-executable instructions may be in many forms, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Computer program logic implementing all or part of the functionality described herein is embodied in various forms, including, but in no way limited to, a source code form, a computer executable form, a hardware description form, and various intermediate forms (for example, mask works, or forms generated by an assembler, compiler, linker, or locator). In an example, source code includes a series of computer program instructions implemented in various programming languages, such as an object code, an assembly language, or a high-level language such as OpenCL, RTL, Verilog, VHDL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In some embodiments, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc.

Other components such as external storage, additional sensors, controllers for audio/video display, and peripheral devices may be attached to the board as plug-in cards, via cables, or integrated into the board itself. In another example embodiment, the electrical circuits of the FIGURES may be implemented as standalone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this disclosure.

In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Interpretation of Terms

All definitions, as defined and used herein, should be understood to control over dictionary definitions, definitions in documents incorporated by reference, and/or ordinary meanings of the defined terms. Unless the context clearly requires otherwise, throughout the description and the claims:

"comprise," "comprising," and the like are to be construed in an inclusive sense, as opposed to an exclusive or exhaustive sense; that is to say, in the sense of "including, but not limited to".

"connected," "coupled," or any variant thereof, means any connection or coupling, either direct or indirect, between two or more elements; the coupling or connection between the elements can be physical, logical, or a combination thereof.

"herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined.

Elements other than those specifically identified by the "and/or" clause may optionally be present, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "between" is to be inclusive unless indicated otherwise. For example, "between A and B" includes A and B unless indicated otherwise.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke 35 U.S.C. § 3.3.2(f) as it exists on the date of the filing hereof unless the words "means for" or "steps for" are specifically used in the particular claims; and (b) does not intend, by any statement in the disclosure, to limit this disclosure in any way that is not otherwise reflected in the appended claims.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

SELECT EXAMPLES

Example 1 includes a system for witness integrity sensing comprising a plurality of sensors, a hotspot transceiver configured to transmit a point-to-point radiofrequency energy signal, and a sensor platform including an antenna configured to receive the radiofrequency energy signal, an energy harvesting module coupled to the antenna configured to convert the radiofrequency energy signal to charge for powering the sensor platform, and a sensor multiplexer, coupled to each of the plurality of sensors via a respective plurality of wires, wherein the sensor multiplexor is configured to collect sensed data from the plurality of sensors via the respective plurality of wires.

Example 2 includes a system according to example 3, further comprising a processor configured to receive the sensed data from the plurality of sensors and perform cluster-based edge-integrity analytics.

Example 3 includes a system according to one or more of the preceding examples, further comprising a processor configured to receive sensed data from the plurality of sensors and a transceiver configured to transmit the sensed data.

Example 4 includes a system according to one or more of the preceding examples, wherein the multiplexer is configured to collect the sensed data from each of the plurality of sensors sequentially.

Example 5 provides a system according to one or more of the preceding examples, wherein each of the plurality of sensors is a structural integrity sensor Example 6 provides a system according to one or more of the preceding examples, wherein each of the plurality of sensors is configured to sense at least one of cracking, corrosion, and strain.

Example 7 provides a system according to one or more of the preceding examples, wherein the antenna is tuned to a worldwide radiofrequency band.

Example 8 provides a system according to one or more of the preceding examples, further comprising an energy storage module, wherein the energy storage module is configured to store the charge from the energy harvesting module, and wherein the energy storage module is configured to provide the charge to the sensor platform.

Example 9 provides a system according to one or more of the preceding examples, wherein a cold start time for the sensor platform to collect the sensed data from the plurality of sensors is a time for the energy storage module to reach a minimum system operational voltage.

Example 10 provides a method for witness integrity sensing comprising emitting static radiofrequency transmission beam including a radiofrequency signal from a hotspot transceiver, receiving the radiofrequency signal at an antenna, converting the radiofrequency signal to charge at an energy harvesting module, providing the charge to a sensor platform including a multiplexer, wherein the multiplexer is connected to a plurality of sensors via a plurality of wires, collecting sensed data from each of the plurality of sensors at the multiplexer, wherein collecting sensed data includes collecting sensed data consecutively, at the multiplexer, from the plurality of sensors.

Example 11 provides a method according to one or more of the preceding examples, wherein collecting sensed data consecutively, at the multiplexer, includes collecting sensed data consecutively to each sensor of the plurality of sensors.

Example 12 provides a method according to one or more of the preceding examples, wherein collecting sensed data consecutively, at the multiplexer, includes collecting sensed data consecutively to a first portion of the plurality of sensors and a second portion of the plurality of sensors.

Example 13 provides a method according to one or more of the preceding examples, further comprising receiving the sensed data at a processor.

Example 14 provides a method according to one or more of the preceding examples, further comprising performing cluster-based edge-integrity analytics on the sensed data to generate a data signal.

Example 15 provides a method according to one or more of the preceding examples, further comprising wirelessly transmitting the data signal to the hotspot transceiver.

Example 16 provides a method according to one or more of the preceding examples, further comprising storing the charge from the energy harvesting module in an energy storage module, and providing the stored charge to the sensor platform.

Example 17 provides a multi-sensor witness integrity sensor platform, comprising a plurality of sensors, a hotspot transceiver configured to transmit a point-to-point radiofrequency energy signal, and a computing device communicatively coupled with the plurality of sensors by wired connections, wherein the passive computing device is configured to receive the radiofrequency signal, convert the radiofrequency signal to charge, power a sensor platform using the charge, and receive sensed data from respective ones of the plurality of sensors through the wired connections.

Example 18 provides a multi-sensor witness integrity sensor platform according to one or more of the preceding examples, wherein the passive computing device includes a multiplexer configured to collect the sensed data sequentially from each of the plurality of sensors.

Example 19 provides a multi-sensor witness integrity sensor platform according to one or more of the preceding examples, wherein the computing device is further configured to provide a wireless data signal based on the sensed data.

Example 20 provides a multi-sensor witness integrity sensor platform according to one or more of the preceding examples, wherein the computing device is further configured to perform cluster-based edge-integrity analytics on the sensed data.

Example 21 includes a passive 3D MS-WISP comprising a sensor multiplexer layer, a sensing platform digital layer, an EH and power-management layer, and a RF EH antenna layer, wherein the MS-WISP is to eliminate the need for an energy transfer beam steering mechanism to power a sensor cluster mounted at a hotspot.

Example 22 includes the passive 3D MS-WISP according to one or more of the preceding examples, wherein the sensing digital layer includes a processor to perform cluster-based edge-integrity analytics.

Example 23 includes the passive 3D MS-WISP WISP according to one or more of the preceding examples, wherein the multiplexer layer is to interface with a mix of WISP sensing elements.

Example 24 includes the passive 3D MS-WISP according to one or more of the preceding examples, wherein the mix of WISP sensing elements can be any of corrosion, crack, or strain sensing elements Example 25 includes the passive 3D MS-WISP according to one or more of the preceding examples, wherein the multiplexer layer is to use a different mix of WISP sensing elements to perform hotspot integrity analytics.

Example 26 includes the passive 3D MS-WISP according to one or more of the preceding examples, wherein the RF EH antenna is tuned to use a WW ISM RF band.

Example 27 includes a passive Multi-Sensor Witness Integrity Sensing system comprising of a passive 3D MS-WISP connected to a cluster of sensing elements and powered by a mounted energy exciter with a fixed antenna.

Example 28 includes a MS-WISP comprising a plurality of sensors; and a computing device electrically and communicatively coupled with the plurality of sensors by a wired connection, wherein the computing device is to: generate power based on a wireless signal received from a transceiver; provide the power to respective sensors of the plurality of sensors; receive sensed data from respective ones of the sensors; and provide a wireless data signal to the transceiver based on the sensed data.

Example 29 includes the MS-WISP according to one or more of the preceding examples, wherein respective sensors of the plurality of sensors are a corrosion sensor, a crack sensor, or a stress sensor.

Example 30 includes the MS-WISP according to one or more of the preceding examples, wherein the MS-WISP is to be used to detect structural data related to a vehicle.

Example 31 includes the MS-WISP according to one or more of the preceding examples, wherein the vehicle is a helicopter.

Example 32 includes the MS-WISP according to one or more of the preceding examples, wherein the MS-WISP includes a plurality of logical layers.

Example 33 includes the MS-WISP according to one or more of the preceding examples, wherein a layer of the plurality of logical layers includes an antenna layer with a RF EH antenna.

Example 34 includes the MS-WISP according to one or more of the preceding examples, wherein the RF EH antenna is to send or receive wireless signals to or from the transceiver based on a WW ISM RF band.

Example 35 includes the MS-WISP according to one or more of the preceding examples, wherein the RF EH antenna is to send or receive wireless signals to or from the transceiver based on a RFID signal.

Example 36 includes the MS-WISP according to one or more of the preceding examples, wherein a multiplexer layer is configured to use a different mix of WISP sensing elements to perform hotspot integrity analytics.

Example 37 includes a sensor system for use in a vehicle, wherein the sensor system includes: a transceiver; and a MS-WISP communicatively coupled with the transceiver by a wireless connection, wherein the MS-WISP includes a computing device electrically and communicatively coupled with a plurality of sensors by a wired connection, wherein the computing device is to generate power from a wireless signal received from the transceiver and provide the power to respective sensors of the plurality of sensors based on a wireless signal received from the transceiver.

Example 38 includes a passive MS-WISP comprising a sensor multiplexer layer, sensing platform digital layer, an EH and power-management layer and a RF EH antenna layer to eliminate the need for an energy transfer beam steering mechanism to power a sensor cluster mounted at a structure hotspot.

Example 39 may include a helicopter that includes the subject matter of any of examples 1-38, or some other example herein.

Example 40 may include an electronic device that includes the subject matter of any of examples 1-39, or some other example herein.

Example 41 may include a method of manufacturing the subject matter of any of examples 1-40, or some other example herein.

Example 42 may include an apparatus comprising means to perform functions of wired or wireless communication or power transfer related to any of examples 1-41, or some other example herein.

Example 43 may include one or more non-transitory computer-readable media comprising instructions that, upon execution of the instructions by a processor of a computing device, are to cause the computing device to perform functions of wired or wireless communication or power transfer related to any of examples 1-42, or some other example herein.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Figures, or the claims.

What is claimed is:

1. A system for witness integrity sensing comprising:
a plurality of sensors;
a hotspot transceiver configured to transmit a point-to-point radiofrequency energy signal, wherein the point-to-point radiofrequency energy signal is a non-steerable transmission beam; and
a sensor platform including:
an antenna configured to receive the radiofrequency energy signal,
an energy harvesting circuit coupled to the antenna configured to convert the radiofrequency energy signal to charge for powering the sensor platform, and
a sensor multiplexor, coupled to each of the plurality of sensors via a respective plurality of wires, wherein the sensor multiplexor is configured to collect sensed data from the plurality of sensors via the respective plurality of wires, and wherein each of the plurality of sensors is remote from the sensor platform.

2. The system of claim 1, wherein the sensed data is in an analog form, and wherein the system for witness integrity sensing further comprises:
an analog-to-digital converter (ADC) configured to:
receive the sensed data in the analog form from the sensor multiplexor; and
convert the sensed data from the analog form to a digital form; and
a processor configured to:
receive the sensed data in the digital form from the ADC.

3. The system of claim 2, further comprising a transceiver configured to:
receive the sensed data in the digital form; and
transmit the sensed data in the digital form.

4. The system of claim 1, wherein each of the plurality of sensors is a structural integrity sensor.

5. The system of claim 4, wherein each of the plurality of sensors is configured to sense at least one of cracking, corrosion, and strain.

6. The system of claim 1, wherein the antenna is tuned to a worldwide radiofrequency band.

7. The system of claim 1, further comprising an energy storage circuit, wherein the energy storage circuit is configured to store the charge from the energy harvesting circuit, and wherein the energy storage circuit is configured to provide the charge to the sensor platform.

8. The system of claim 7, wherein a cold start time for the sensor platform to collect the sensed data from the plurality of sensors is a time for the energy storage circuit to reach a minimum system operational voltage, and wherein point-to-point radiofrequency energy signal transmission optimizes the cold start time.

9. The system for witness integrity sensing of claim 1, wherein each of the plurality of sensors are passive sensors.

10. The system for witness integrity sensing of claim 1, wherein the sensor multiplexor provides power to the plurality of sensors via the respective plurality of wires.

11. A method for witness integrity sensing comprising:
emitting non-steerable radiofrequency transmission beam including a radiofrequency signal from a hotspot transceiver, wherein the radiofrequency signal is a static point-to-point transmission beam;
receiving the radiofrequency signal at an antenna;
converting the radiofrequency signal to charge at an energy harvesting circuit;
providing the charge to a sensor platform including a multiplexor, wherein the multiplexor is connected to a plurality of sensors via a plurality of wires, wherein each of the plurality of sensors is remote from the sensor platform; and
collecting sensed data from each of the plurality of sensors at the multiplexor, wherein collecting sensed data includes collecting sensed data consecutively, at the multiplexor, from the plurality of sensors.

12. The method of claim 11, wherein collecting sensed data consecutively, at the multiplexor, includes collecting sensed data consecutively from each sensor of the plurality of sensors.

13. The method of claim 11, wherein collecting sensed data consecutively, at the multiplexor, includes collecting sensed data consecutively from a first group of the plurality of sensors and a second group of the plurality of sensors.

14. The method of claim 11, further comprising receiving the sensed data at a processor, and processing the sensed data to generate a data signal.

15. The method of claim 14, further comprising wirelessly transmitting the data signal to the hotspot transceiver.

16. The method of claim 11, further comprising storing the charge from the energy harvesting circuit in an energy storage circuit, and providing the stored charge to the sensor platform.

17. The method of claim 11, wherein emitting a non-steerable radiofrequency transmission beam includes emitting a point-to-point transmission beam, and wherein emitting a point-to-point transmission beam optimizes a cold start time of the plurality of sensors.

* * * * *